United States Patent

[11] 3,588,622

[72] Inventors Louis F. Mankowski, Jr.
Chicago;
Jeffrey P. Mills, Maywood, Ill.

[21] Appl. No. 815,837
[22] Filed Apr. 14, 1969
[45] Patented June 28, 1971
[73] Assignee GTE Automatic Electric Laboratories Incorporated

[54] DC CABLE DRIVER CIRCUIT FREE FROM VOLTAGE VARIATIONS BETWEEN SEPARATED GROUNDS
2 Claims, 4 Drawing Figs.

[52] U.S. Cl. .......... 317/148.5, 307/208, 179/16, 178/70
[51] Int. Cl. .......... H04m 3/18
[50] Field of Search .......... 179/16 (EC); 307/11, 12, 33, 208

[56] References Cited
UNITED STATES PATENTS

| | | | |
|---|---|---|---|
| 3,381,089 | 4/1968 | Delanoy et al. .......... | 307/208X |
| 3,383,526 | 5/1968 | Berding .......... | 307/208X |
| 3,440,440 | 4/1969 | Prohofsky et al. .......... | 307/208 |

*Primary Examiner*—Lee T. Hix
*Attorneys*—Cyril A. Krenzer, K. Mullerheim, B. E. Franz and Glenn H. Antrim

ABSTRACT: An interface circuit in each line of a cable extending between electromechanical switches and electronic switches has high impedance to noise signals induced into the line. The noise is induced into the line, particularly into its common ground return portion, by operating currents of the electromechanical switches. The high impedance interface circuit substantially eliminates the current caused by noise and thereby prevents undesired operation of the sensitive electronic switches. The high impedance is provided by a transistor connected in the transmitting end of each line, the transistor being connected to operate in a constant-current, unsaturated mode.

INVENTORS
LOUIS F. MANKOWSKI Jr.
JEFFERY P. MILLS
BY
Glenn H. Antrim
ATTY.

DC CABLE DRIVER CIRCUIT FREE FROM VOLTAGE VARIATIONS BETWEEN SEPARATED GROUNDS

BACKGROUND OF THE INVENTION

This invention pertains to interface circuits connected between electronic switches and electromechanical switches, and particularly to cable drivers having high impedance to noise caused by operation of the electromechanical switches. Circuits described herein are particularly useful for transmitting binary signals at moderate rates in direct-current coupled transmission lines between fast operating electronic switching circuits and relatively slow operating electromechanical switching circuits. In switching systems, for example, in telephone offices having central electronic control systems, the different types of interconnected switches are mounted in separated locations to aid in preventing undesired operation of the sensitive electronic switches by interference from operation of the electromechanical switches. However, variations of voltage in interconnecting lines for operating the switches, and particularly in their common return ground circuits, caused by operating currents of the electromechanical switches are still present to cause undesired operation of the electronic switches.

The description of a cable driver in which precautions have been taken to prevent undesired operation begins on page 2045 of Volume XLIII, Number 5, of the Bell System Technical Journal, Sept. 1964. The cable driver includes a pickoff transformer suitable for transmitting pulses of short duration from one group of switches to another. A transmission line driver suitable for direct-current transmission in addition to pulse transmission is described in U.S. Pat. 2,995,667 issued to G. L. Clapper et al. on Aug. 8, 1961. A source of binary input signal operates a transistor, and a line extending to a receiver is connected to the emitter of the transistor. The transistor is in a saturated state during one level of the binary input signal.

SUMMARY OF THE INVENTION

The present cable driver has a transistor connected to provide, during its conductive intervals, substantially constant current to a conductor of a cable. Since variations in voltage induced in the conductors of the cable or in the common return ground circuit do not affect the current flow, the transistor has high impedance to induced noise signals caused by operation of electromechanical switches. The desired high impedance is provided by connecting the collector of the transistor through the cable to a source of collector voltage at the input of a receiver and by biasing the emitter to prevent saturation.

High impedance is not provided in those former driver circuits in which the transistors are operated in a saturated condition. In transformer coupled circuits, DC signal current cannot be transmitted over long intervals, and furthermore the transformers are relatively expensive.

DESCRIPTION OF THE PREFERRED EMBODIMENTS

Figure 1:
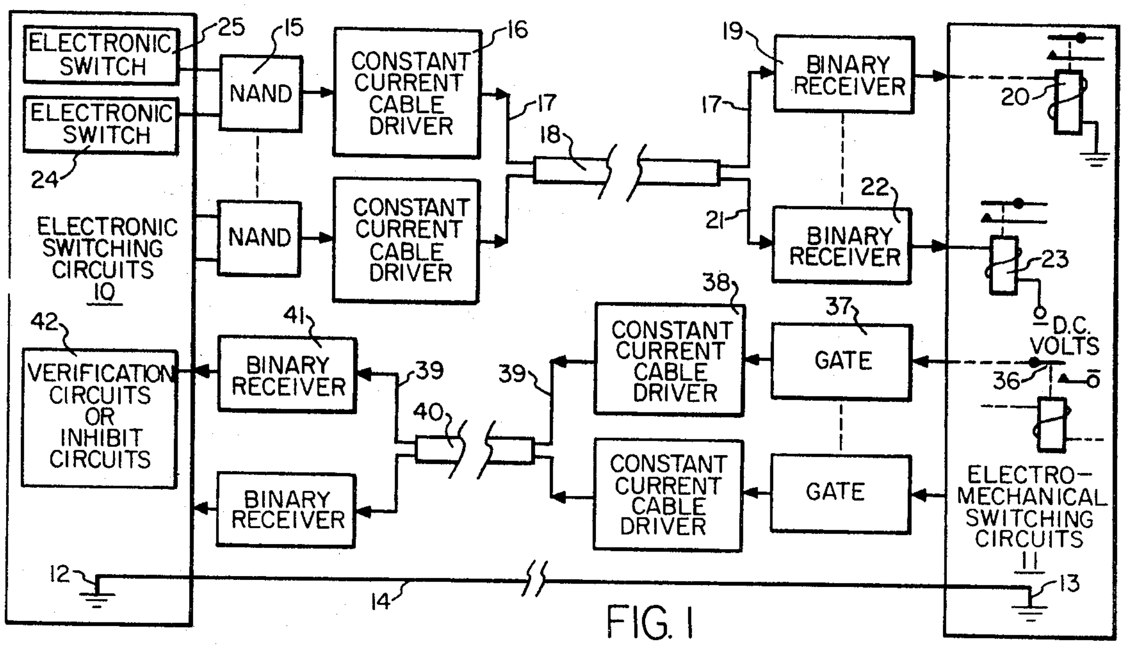
FIG. 1 is a block diagram showing constant-current cable drivers of this invention connected in lines which extend between switching circuits of different types.

The cable driver system shown briefly in FIG. 1 is useful in present telephone systems having central electronic control. Central electronic control circuits operate quickly to interpret input information and to distribute command signals to peripheral circuits, and thereby make different services more readily available than were readily available in former systems which use only electromechanical switches.

Although fast operating electronic switches would be desirable throughout the entire system, electronic switches to provide low resistance line connections economically are not presently available. Supervisory and subscriber signaling control circuits are now usually controlled by electromechanical relays. Therefore, interface circuits must be provided between different types of switches in new systems, and also between new electronic systems and existing electromechanical systems.

The interface circuits shown briefly in FIG. 1 provide necessary isolation between ground circuits of electromechanical switching circuits and control circuits of sensitive electronic switching circuits. In order to decrease erroneous operation of electronic switching circuits 10 caused by operating currents of the electromechanical switching circuits 11, the different types of switching circuits are mounted on respective frames in different locations. The different types of switching circuits are interconnected by cables and common return ground circuits to transmit DC operating currents to switches to be operated. The usual precautions of providing low resistance ground circuits for each frame and providing low resistance connection between the frames are not sufficient in themselves to prevent undesired operation of the electronic switches for they are still liable to be operated by variations in voltage resulting from operating currents of the electromechanical switches. Additional isolation between the two types of switches is provided by inserting a constant-current cable driver 16 in each conductor of the interconnecting cables 18 between the different frames of switches. The constant-current cable driver 16 is nonconductive during one level of an input binary signal, and is conductive to provide constant current to a remote binary receiver 19 during the other level of the binary signal. Obviously, while the driver is biased to a nonconductive state and providing undesired voltage variations have insufficient amplitude to cause conduction, varying voltages between the two systems are not effective to operate switches. During the other level of the input signal, the output current of the cable driver 16 is substantially constant in spite of quite wide variations in voltage between the conductor 17 and the input circuits of the constant-current cable driver 16. Therefore, differences in voltage between the ground 12 for the electronic switching circuits and the ground 13 for the electromechanical switching circuits do not affect the flow of operating current although these differences are obviously present between the input circuits of the transistor 26 and the conductor 17 connected to the collector of the transistor.

Figure 2:
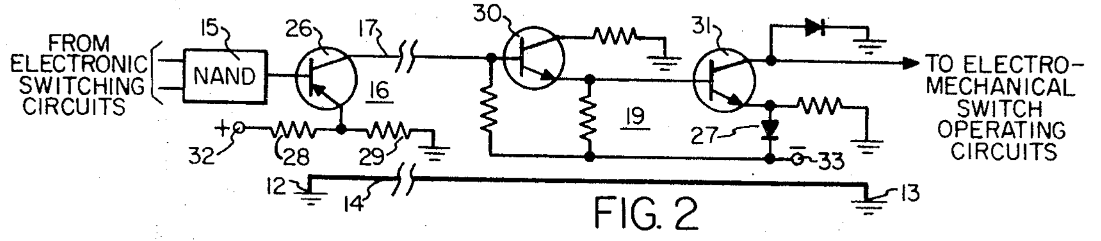
FIG. 2 is a schematic showing a cable driver with its input circuits connected to electronic switching circuits and its output circuit connected through a cable to a binary receiver which connects negative battery to an operating circuit of an electromechanical switch.
Figure 3:
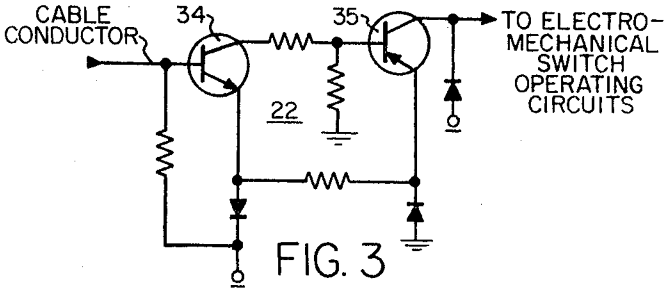
FIG. 3 is a schematic diagram of a binary receiver which can be substituted for the binary receiver of FIG. 2 for connecting ground rather than negative battery to the operating circuit of an electromechanical switch.

With reference to FIG. 1, in a typical telephone switching system, a NAND gate 15 has its output connected to the input of the constant-current cable driver 16, and the inputs of the NAND gate 15 are connected to respective electronic switches 24 and 25 of the electronic switching circuits 10. The electronic switch 24 is operated in response to a command from electronic central control circuits, and then the electronic switch 25 is closed in response to a timing signal to operate the NAND gate 15. The NAND gate 15 in response to application of voltage to both of its inputs, applies voltage from a source (not shown) to the input of the constant-current cable driver 16 to cause it to apply constant current through the conductor 17 of the cable 18 to the input of a binary receiver 19 associated with electromechanical switches mounted apart from the electronic switching circuits. The output of the binary receiver 19 is connected through the operating coil of an electromechanical switch 20 to ground. For a particular switch frame, a terminal of each of the operating windings of switches that perform similar functions would ordinarily all be consistently connected permanently either to ground or to negative DC voltage. However, for illustrative purposes, the output of another binary receiver 22 is shown connected through the winding 23, corresponding to the winding 20, of an electromechanical relay to a source of negative DC voltage rather than to ground. FIG. 2 is a schematic diagram of the binary signal receiver 19 for connecting negative DC voltage to the winding 20 of a relay, and FIG. 3 is a schematic diagram of a receiver 22 for connecting ground to the winding 23 of a relay.

As shown in FIG. 2, the constant-current driver 16 includes a type PNP transistor 26 and a bias circuit arrangement connected to its emitter to prevent saturation of the emitter-collector circuit of the transistor while it is conductive. The output of the NAND gate 15 is connected to the base of the transistor 26. The emitter of the transistor 26 is connected to the junction of serially connected resistors 28 and 29 comprising a voltage divider, connected between ground and a source of DC voltage at terminal 32, for applying positive bias to the emitter. The collector of the transistor 26 is connected through the conductor 17 to the input of the binary signal receiver 19.

In a typical circuit, the resistance values of the resistors 28 and 29 in the emitter circuit of the transistor 26 are chosen to provide positive 3 volts on the emitter. Until voltage corresponding to the "1" of a binary signal is applied to both inputs of the NAND gate 15, the voltage applied from the NAND gate to the base of the transistor 26 is positive with respect to the bias voltage applied to its emitter so that the transistor is nonconductive. When the voltages at both of the inputs of the NAND gate 15 correspond to the binary 1, the output voltage of the NAND gate is zero (ground) so that the transistor 26 is conductive. The emitter-collector current of the transistor 26 may be traced from the junction of the bias resistors 28 and 29, the emitter-collector circuit of the transistor 26, the conductor 17 of a cable, and the input circuits of the binary signal receiver 19 to a terminal 33 which is connected to a source of negative direct-current voltage. the binary signal receiver 19 has transistors 30 and 31 and associated resistors connected in a conventional manner so that when current flows over the conductor 17, the transistor 31 is conductive to apply operating current from its collector circuit to an operating circuit of an electromechanical switch. The binary signal receiver 19 may be called a main-battery switch for it applies negative DC voltage from the terminal 33 through the diode 27 and the emitter-collector circuit of the transistor 31 to an energizing winding of an electromechanical switch.

The ground symbols 12 and 13, FIG. 2, represent grounded frames for the electronic switches and the electromechanical switches respectively. Ordinarily a low resistance conductive path exists between the frames as represented by the conductor 14. However, in spite of usual precautions, voltage variations or noise appears between the two frames as a result of changing currents caused by operation of the electromechanical switches. These variations are prevented from being impressed upon the electronic circuits by the high impedance at the collector of the transistor 26 of the constant-current cable driver 16. Even if the voltage difference between grounds 12 and 13 is a constant direct-current voltage of moderate value, it will not affect the operation of either the electronic or the electromechanical switches. The value of the resistor 29 is chosen to prevent saturation of the transistor 26 as the NAND circuit 15 operates and effectively grounds the base of the transistor 26. The result is that the current in the conductor 17 remains substantially constant during the conductive state of the transistor 26 even though its collector voltage varies substantially from the usual value of negative DC voltage which is supplied from the input circuits of the binary-signal receiver 19.

The binary-signal receiver of FIG. 3 has a first stage which uses a transistor 34 and is quite similar to the first stage of the binary signal receiver 19 of FIG. 2. The second stages of the receivers 19 and 22 differ in that the respective transistors 31 and 35 are complementary types. The emitter-collector current through the transistor 35 is in the opposite direction from that through the transistor 31. Since the transistor 35 applies ground to an electromechanical switch, the binary receiver 22 may be designated a main-ground switch.

In addition to being used as an isolating element in a transmission line for transmitting binary operating signals in the direction from electronic switching circuits to electromechanical switching circuits, the constant-current driver is also used for the same purpose in a line for transmitting control signals or verification signals in the opposite direction from contacts of electromechanical switches to control circuits of electronic switching circuits. As shown in FIG. 1, contacts 36 of the electromechanical switching circuit 11 are connected to the input of a gate 37 and, the output of the gate 37 is connected to the input of a constant-current driver 38. The output of the constant-current driver is connected through a conductor 39 of a cable 40 to the input of a binary signal receiver 41. The output of the binary signal receiver 41 is connected to control circuits of the electronic switching circuits 10, for example, verification circuits or inhibit circuits 42. The circuits 42 may be utilized by electronic logic circuits to verify the operating conditions of the electromechanical switching circuits 11, or the output of the binary receiver 41 may be used to inhibit electronic logic circuits which are interconnected with those electronic logic circuits which have determined the state of operation of the contacts 36 of the electromechanical switching circuits 11.

Figure 4:
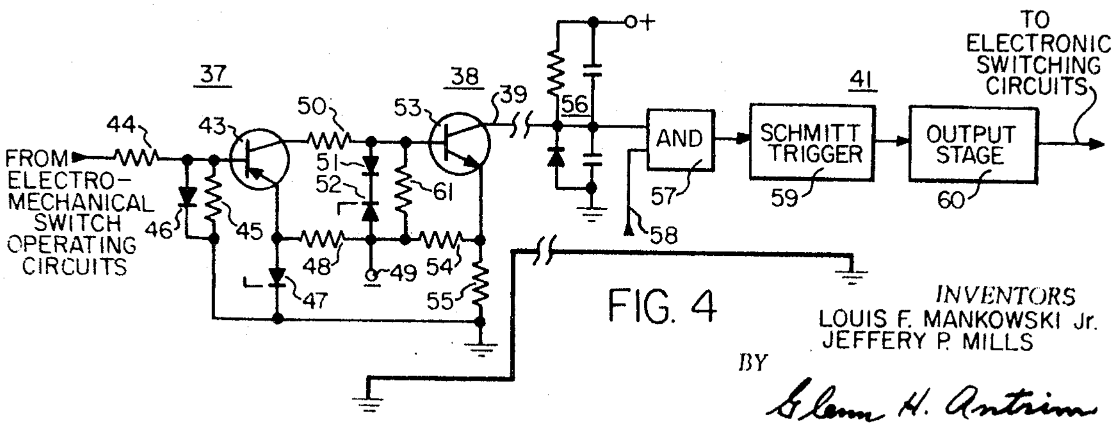
FIG. 4 is a schematic diagram of constant-current driver having its input connected to sense the operating conditions of an electromechanical switch, and its output connected through a cable to a binary signal receiver which is connected to electronic switching circuits.

The circuit for monitoring the state of operation of contacts of electromechanical switching circuits is shown in more detail in the combination schematic and block diagram of FIG. 4. In this embodiment, contacts to be tested are to be connected to a resistor 44, and closure of the contacts is indicated by the presence of negative direct-current voltage. The input gate 37 utilizes the type PNP transistor 43, and the constant-current cable driver 38 utilizes a type NPN type transistor 53. The contacts that are to be tested are connected through a resistor 44 to the base of the transistor 43. A diode 46 and a resistor 45 are connected in parallel between the base and the common ground of the electromechanical switching circuits and their cable drivers. The diode 46 protects the transistor 43 from high transient voltages, and the resistor 45 normally applies ground voltage to a base to prevent conduction of the transistor 43. The emitter of the transistor is biased negatively by the amount of the voltage drop across the breakdown diode 47 to which negative DC voltage is applied from a terminal 49 through a resistor 48. Negative voltage from the terminal 49 is applied through a breakdown diode 52, a diode 51 which permits the breakdown diode 52 to be shared among similar circuits, and a resistor 50 to the collector of the transistor 43. The base of the type NPN transistor 53 of the cable driver 38 is connected to the junction of the resistor 50 and the diode 51, and is also connected through a resistor 61 to the source of negative direct-current voltage that is connected to the terminal 49. The emitter of the transistor 53 is connected to the junction of the resistors 54 and 55 that comprise a voltage divider connected between the terminal 49 and ground. The collector of the transistor 53 is connected through the cable conductor 39 to a source of positive direct-current voltage at the input circuits of a binary-signal receiver 41 which has its output connected to electronic switching circuits.

Normally the transistor 43 of the gate circuit and the transistor 53 of the cable driver are nonconductive. The transistor 43 becomes saturated in response to the closure of the contacts connected to the resistor 44 because the negative voltage applied to the base of the transistor 43 is then slightly greater than the voltage drop across the breakdown diode 47. The collector current of the transistor 43 causes the breakdown diode 52 to become conductive and apply a substantially constant voltage between the base and the emitter of the transistor 53. The voltage drop across the breakdown diode 52 in conjunction with the voltage drops across the resistors 54 and 55 connected to the emitter of the transistor 53, causes the transistor 53 to become conductive at a point below saturation. As described above, the current flow in the conductor 39 connected to the collector of the transistor 53 is substantially constant regardless of DC voltage differences or noise voltages between the respective grounds of the electromechanical switching circuits and the electronic switching circuits.

The binary signal receiver 41 connected to the electronic switching circuits includes an integrator 56, an AND gate 57, a Schmitt trigger circuit 59, and an output stage 60 that is connected to electronic switching circuits. The integrator 56 prevents contact bounce being interpreted as multiple contact closure. In response to the transistor 53 becoming conductive, the Schmitt trigger circuit 59 operates after an interval determined by the time constant of the integrator 56. Operation of the Schmitt trigger circuit 59 applies a predetermined voltage through the output stage 60 to electronic logic circuits represented by block 42 of FIG. 1. The Schmitt trigger circuit can also be operated by connecting ground to input lead 58 of the AND gate 57.

We claim:

1. In a logic circuit having fast operating electronic switches and relatively slow operating electromechanical switches, said switches being separated according to type and a cable operatively interconnecting said different types of switches;

a constant-current cable driver having an input connected to said electronic switches, a binary signal receiver having its output connected to energizing circuits of said electromechanical switches, the output of said constant-current cable driver being connected through a respective conductor of said cable to the input of said binary signal receiver, a source of direct-current voltage, the output circuit of said cable driver, said respective conductor, the input of said receiver, said source of voltage, and a ground return circuit being connected to form a direct-current transmission circuit, the output circuit of said cable driver being nonconductive in response to application of one level of a binary signal to said input circuit of said driver to prevent flow of current to said receiver, and said output circuit of said cable driver having controlled conductivity in response to application of the other level of said binary signal to cause constant current to flow in said transmission circuit, said constant current being substantially unaffected by noise signals in said transmission circuit so that said receiver responds reliably to reproduce said binary signal.

2. In logic switching systems having fast operating electronic-type of logic circuits and relatively slow electromechanical-type of logic circuits, said logic circuits arranged in different locations according to said types to eliminate undesired operation by induced current, a plurality of electrical cables interconnecting said different types of logic circuits, and a plurality of direct-current interface circuits connecting respective different types of said logic circuits through respective conductors of said cables, each of said interface circuits comprising:

a cable driver amplifier stage and a binary signal receiver, said logic circuits of one of said types connected to the input circuit of said cable driver amplifier stage for applying binary signal thereto, the output circuit of said cable driver amplifier stage connected through a respective conductor of one of said cables to the input circuit of said binary signal receiver, the output of said binary signal receiver connected to said logic circuits of the other of said types, said cable driver amplifier stage including a transistor, said transistor having an emitter, a base, and a collector, said base being in the input circuit of said cable driver amplifier stage, voltage biasing means, said emitter connected through said biasing means to a first common ground circuit at said location of said one type of logic circuits, said collector being in the output circuit of said cable driver amplifier stage, a source of voltage connected to the input circuit of said binary signal receiver and to a second common ground circuit at said location of said other type of logic circuits such that said collector is connected through said respective conductor and said source of voltage to said second common ground circuit, said cable driver amplifier stage receiving binary signal from said one type of logic circuit and being conductive in response to application of one of two levels of binary signal to its input circuit to cause a predetermined constant flow of current through said respective conductor and the input circuit of said binary signal receiver, and said current flow being limited by said biasing means to a value less than the saturation value of the collector current of said transistor so that high impedance at said collector is offered to variations in voltage between said first and second common grounds, whereby noise signals caused by electromechanical switching is isolated from said electronic logic circuits.